United States Patent [19]

Sasaki

[11] Patent Number: 5,793,914
[45] Date of Patent: Aug. 11, 1998

[54] OPTICAL MODULE & METHOD FOR MANUFACTURING THE SAME

[75] Inventor: Junichi Sasaki, Tokyo, Japan

[73] Assignee: NEC Corporation, Tokyo, Japan

[21] Appl. No.: 699,786

[22] Filed: Aug. 20, 1996

[30] Foreign Application Priority Data

Aug. 21, 1995 [JP] Japan .................. 7-212069

[51] Int. Cl.[6] ............................................ G02B 6/30
[52] U.S. Cl. .......................... 385/49; 385/51; 385/88; 228/165; 228/193
[58] Field of Search .......................... 385/49, 51, 88, 385/89, 90, 91; 228/165, 193

[56] References Cited

U.S. PATENT DOCUMENTS

| | | | |
|---|---|---|---|
| 4,479,698 | 10/1984 | Landis et al. | 385/91 |
| 4,702,547 | 10/1987 | Enochs | 385/88 |
| 5,146,520 | 9/1992 | Yuuki et al. | 385/51 |
| 5,475,784 | 12/1995 | Bookbinder et al. | 385/94 |
| 5,555,333 | 9/1996 | Kato | 385/89 |

FOREIGN PATENT DOCUMENTS 62-224097  10/1987  Japan

OTHER PUBLICATIONS

Michael J. Wale et al., "Self–Aligned Flip–Chip Assembly of Photonic Devices with Electrical and Optical Connections", *IEEE Transactions on Components, Hybrids, and Manufacturing Technology*, vol. 13, No. 4, Dec. 1990, pp. 780–786.

*Primary Examiner*—John D. Lee
*Assistant Examiner*—Ellen E. Kang
*Attorney, Agent, or Firm*—Young & Thompson

[57] ABSTRACT

An optical module and method in which an optical element (32) and an optical waveguide (34) are formed on a silicon substrate (31) so that an optical axis of the optical element coincides with an optical axis of the optical waveguide. Metallized films (41, 42) are formed on the silicon substrate and on the optical waveguide respectively, and these metallized films are bonded to each other by mutual diffusion of their atoms.

25 Claims, 7 Drawing Sheets

OPTICAL MODULE & METHOD FOR MANUFACTURING THE SAME

BACKGROUND OF THE INVENTION

The present invention relates to an optical module for use in light communication or the like and more particularly, to an optical module which comprises an optical element and a light or optical waveguide provided on a substrate and a method for manufacturing the optical module.

In an optical module, it has been conventionally necessary that such an optical waveguide as an optical fiber be positioned on a substrate having such an optical element as a semiconductor laser fixed thereto so that optical coupling with the optical element becomes optimum and can be kept in its optimum state.

For the purpose of maintaining the waveguide in the optimum state, such a waveguide has been fixedly mounted onto the substrate by means of soldering material or adhesive agent.

With respect to this type of optical waveguide, in order to achieve optimum optical coupling between the optical waveguide and optical element, there has been suggested a method for positioning these waveguide and element relatively, as shown, e.g., in Japanese Patent Laid-Open Publication No. 62-224097. In the illustrated example, a semiconductor laser is fixedly mounted onto a silicon substrate, an optical fiber is passed through a covering made of solderable material, and then a soldering is formed on the covering to thereby fix the optical fiber.

Also suggested in IEEE Trans. CHMT, Vol. 13, No. 4, 1990 is another example wherein a silicon substrate is subjected thereon to an anisotropic etching process to form a V-shaped groove therein, and the V-shaped groove and an optical fiber are formed thereon with respective metallic films as necessary. More in detail, the optical fiber is mounted in the V-shaped groove as positioned so that an optical axis of the semiconductor laser is aligned with that of the optical fiber, and then fixed thereto by means of soldering material or adhesive agent.

In either example, however, there exists such soldering material or adhesive agent as in a melted state between the substrate and optical waveguide. The soldering material or adhesive agent in the melted state has a high viscosity so that, when a worker melts the soldering material with use of a soldering iron and moves the soldering iron away from the melted soldering material for example, the surface tension of the soldering material causes the soldering material to tend to be pulled toward the soldering-iron moving direction.

Further, since it is difficult to apply a uniform pressure to the melted soldering material or adhesive agent, after the soldering material cools and sets, a resultant set soldering material has an varying thickness.

Such variations in the thickness of the set soldering material causes reduction of an accuracy in the fixed position of the optical waveguide such as an optical fiber, which results in that a shift occurs in their optical axis between the optical element such as a semiconductor laser and the optical waveguide such as an optical fiber, and therefore its optical coupling efficiency undesirably drops.

SUMMARY OF THE INVENTION

It is an object of the present invention to provide an optical module which can solve the above problem in the prior art and in which such an optical waveguide as an optical fiber can be accurately fixed onto a substrate while eliminating the need for use of adhesive or soldering material.

In accordance with an aspect of the present invention, the above object is attained by providing an optical module which comprises an optical element, an optical waveguide having a first metallic film formed thereon and a substrate having a second metallic film formed thereon and corresponding to a mounting area of the optical waveguide thereon, wherein the optical waveguide is fixed mounted to the substrate through the first and second metallic films.

With this arrangement, since both adhesive and soldering material are not used, a positioning accuracy between the optical element and optical waveguide can be increased.

Further, the optical waveguide can be installed in a first groove made in the substrate. A second groove can be made in the substrate to intersect the first groove, and the optical waveguide can be positioned so that the optical waveguide comes at its end face into contact with an inner wall face of the second groove.

Furthermore, a plurality of optical waveguides can be disposed on the substrate, and the optical waveguides and a part of the substrate in the vicinity thereof can be covered with filling material.

In accordance with another aspect of the present invention, there is provided a method of manufacturing an optical module which comprises the steps of forming a first metallic film on a substrate at a position where an optical waveguide is to be mounted; forming a second metallized film on the optical waveguide at least a part of the optical waveguide to be contacted with the first metallic film of the substrate, contacting the second metallized film of the optical waveguide with the first metallized film of the substrate, heating and pressing the first and second metallized films; and installing an optical element on the substrate at a position where the optical element is optically coupled with an end face of the optical waveguide.

In addition to the above steps, there are added steps of previously making a first groove in an area of the substrate where the first metallized film is to be formed, and forming the first metallized film on an inner wall face of the first groove. A second or third groove may be made in the substrate at such a position as to intersect the first groove.

The optical waveguide is positioned so that one end face of the optical waveguide to be optically coupled with the optical element comes into contact an inner wall face of the second groove.

At the time of carrying out the pressing step, vibration can be applied to at least one of the substrate and optical waveguide. After the optical waveguide is fixed, the optical waveguide and its vicinity can be covered with filling material. A plurality of metallized films can be formed on the substrate to install a plurality of the optical waveguides on the plurality of metallized films. In this case, the pressing step can be carried out by placing a buffering material on the plurality of optical waveguides and then pressing the buffering material from its upper side.

BRIEF DESCRIPTION OF THE DRAWINGS

The above and other objects, features and advantages of the present invention will become apparent from the following detailed description when taken with the accompanying drawing in which.

DESCRIPTION OF THE PREFERRED EMBODIMENTS

Explanation will first be made as to the arrangements of prior art optical modules with reference to FIGS. 1 to 6.

Figure 1:
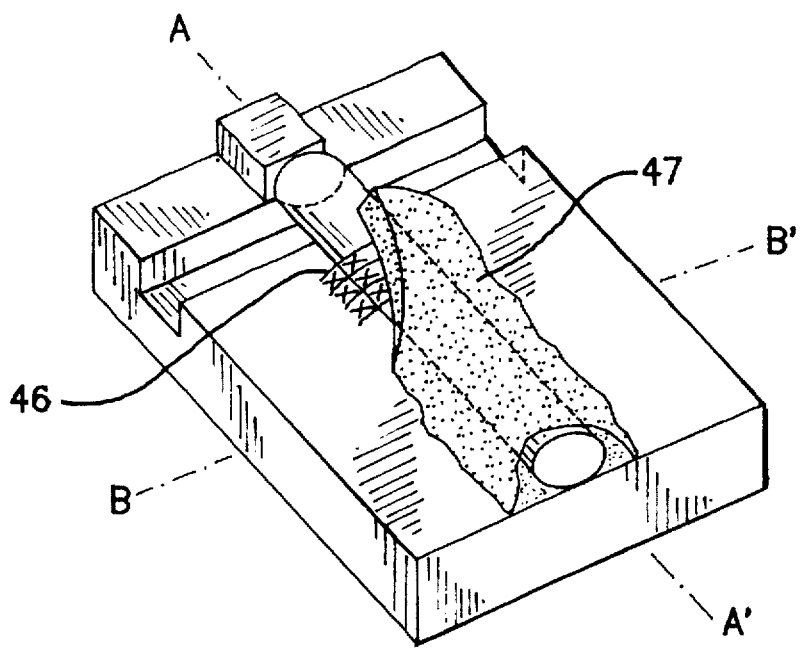
FIG. 1 is a perspective view of a prior art optical waveguide.
Figure 2:
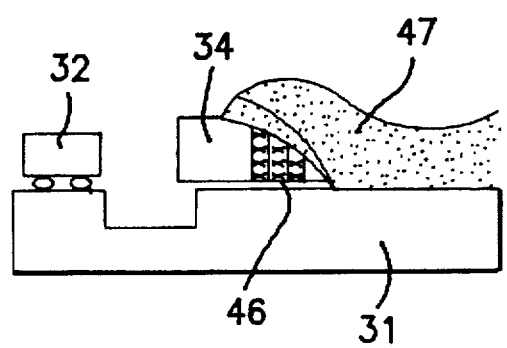
FIG. 2 is a cross-sectional view taken along line A–A' in FIG. 1.
Figure 3:
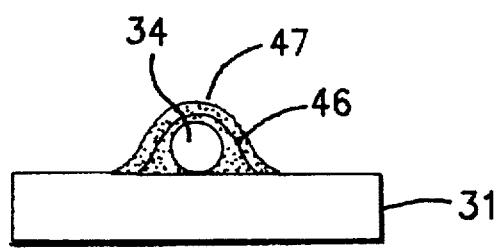
FIG. 3 is a cross-sectional view taken along line B–B' in FIG. 1.

A first prior art optical module is shown in FIGS. 1, 2 and 3 wherein FIG. 1 is a perspective view thereof, FIG. 2 is a cross-sectional view taken along line A–A' in FIG. 1, and FIG. 3 is a cross-sectional view taken along line B–B' in FIG. 1. In this prior art example, a mesh-like covering 46 for fixing of an optical fiber 34, which is made of such material as to have a high conformability with a soldering material 47, is provided on a silicon substrate 31 having a semiconductor laser 32 fixed thereon. The optical fiber 34 is passed through the covering 46 and then solder-jointed thereto to thereby achieve a relatively positioned relationship between the semiconductor laser 32 and optical fiber 34.

Figure 4:
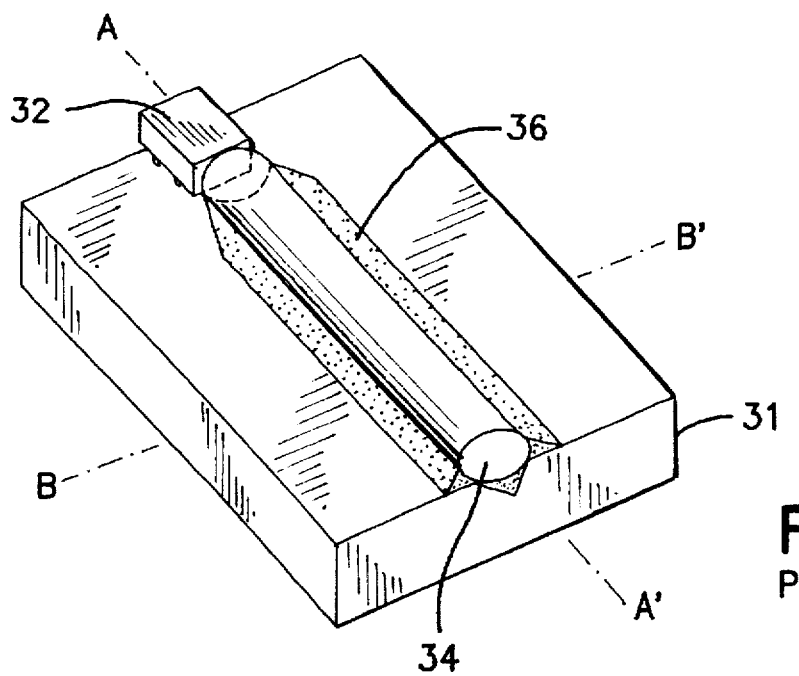
FIG. 4 is a perspective view of another prior art optical waveguide.
Figure 5:
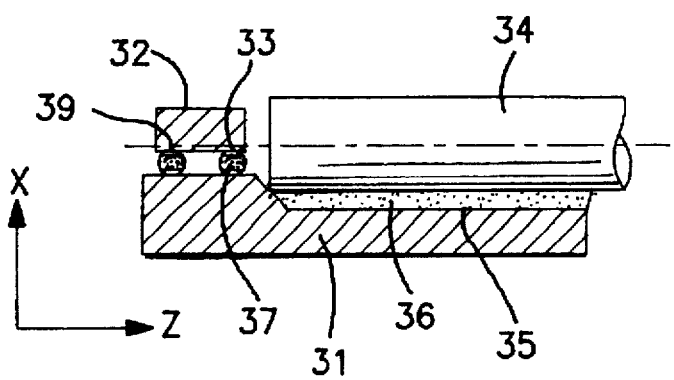
FIG. 5 is a cross-sectional view taken along line A–A' in FIG. 4.
Figure 6:
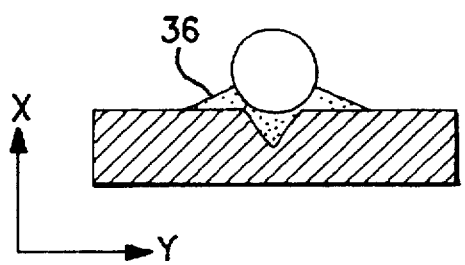
FIG. 6 is a cross-sectional view taken along line B–B' in FIG. 4.

A second prior art optical module is shown in FIGS. 4, 5 and 6 wherein FIG. 4 is a perspective view thereof, FIG. 5 is a cross-sectional view taken along line A–A' in FIG. 4, and FIG. 6 is a cross-sectional view taken along line B–B' in FIG. 4. The substrate-side electrode pads 37 and laser-side electrode pads 39 are fixed by means of solder bumps 33 on the silicon substrate 31 and then the semiconductor laser 32 is fixed. Formed in the silicon substrate 31 is a V-shaped groove 35 by subjecting the silicon substrate 31 to an anisotropic etching process. The optical fiber 34 is positioned and fixed so that the optical axis of the semiconductor laser 32 is aligned with that of the optical fiber 34 located within the V-shaped groove 35. In the illustrated example, the joint positioning of the semiconductor laser 32 with respect to the optical fiber 34 is effected by the self-alignment effect of the solder bumps 33, i.e., by the reflowing property thereof. The optical fiber 34 is fixedly mounted to the substrate with soldering material or adhesive 36.

With these prior art optical modules, since the optical fiber is fixed with use of soldering material or adhesive, it is impossible to achieve a high positioning accuracy.

Figure 14:
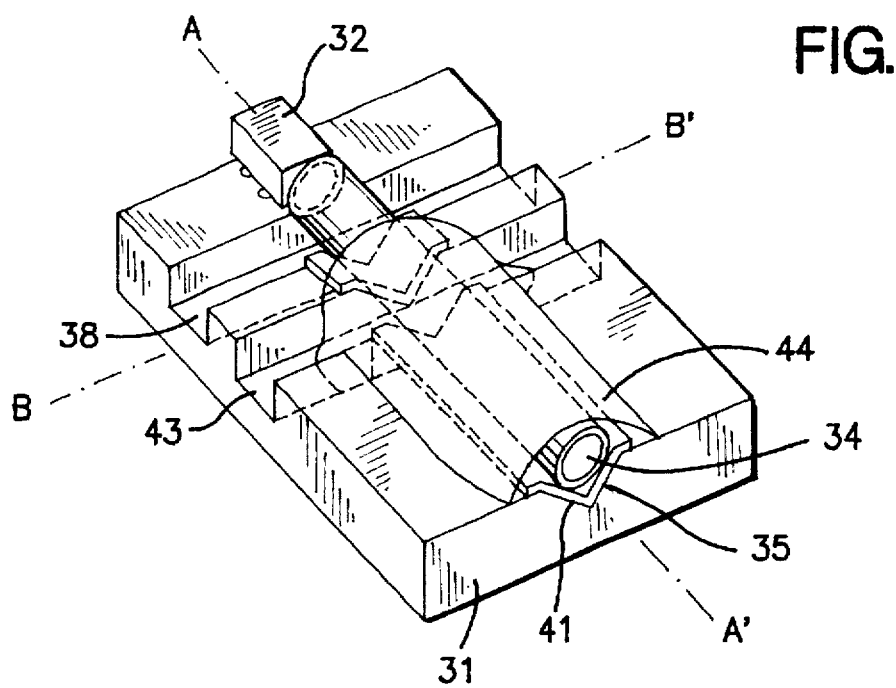
FIG. 14 is a perspective view of an optical module after filling material is coated on the optical fiber fixed to the silicon substrate.

Explanation will next be made as to an embodiment of the present invention. An exemplary arrangement of an optical fiber in accordance with the present invention is shown in FIG. 14.

A silicon substrate 31 is formed therein with a first groove 35 which in turn is coated on its inner wall with a gold film 41. Also formed in the silicon substrate are second and third grooves 38 and 43 which intersect the first groove 35.

An optical fiber 34 is coated thereon with a gold film. The optical fiber 34 is also installed within the first groove 35 so as to come at its end face into contact with a side wall face of the second groove 38. Fixing between the gold film of the optical fiber 34 and the gold film 41 of the first groove 35 is achieved by a bonding tool. A semiconductor laser 32 is provided so as to face the aforementioned end face of the optical fiber.

Formed around the optical fiber 34 is a resin 44 for protection and fixing of the optical fiber. The third groove 43 functions to prevent the resin 44 from flowing as far as the semiconductor laser. The resin 44 is not always required. In this connection, when the resin 44 is not employed, the third groove 43 also becomes unnecessary.

Figure 18:
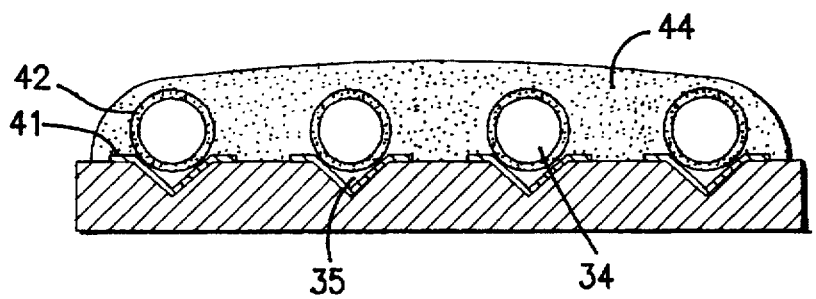
FIG. 18 is a cross-sectional view of an optical module after filling material is coated on a plurality of optical fibers fixed on the silicon substrate.

Another exemplary arrangement of the optical module of the present invention is shown in FIG. 18 in which a plurality of first grooves 35 and a plurality of optical fibers 34 are provided.

Figure 19:
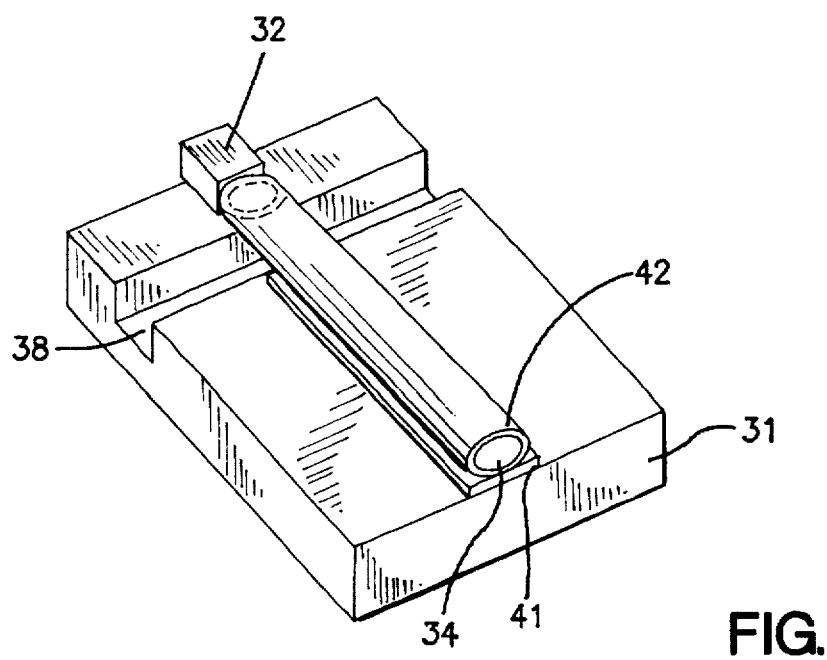
FIG. 19 is a perspective view of an optical module after the optical fibers are mounted on the substrate but the first groove is not made therein.

Shown in FIG. 19 is yet another exemplary arrangement of the optical module of the invention, wherein the first groove 35 is not provided and an optical fiber is fixedly mounted directly on a gold film provided on a silicon substrate.

A detailed example of a method for manufacturing an optical module in accordance with the present invention will then be explained below.

Figure 7:
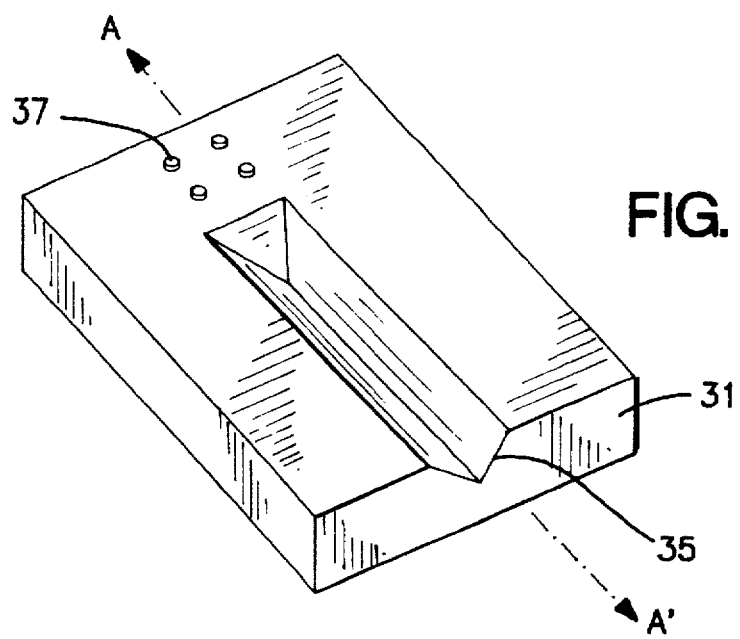
FIG. 7 is a perspective view of a silicon substrate having a first groove formed in a first step of a method of manufacturing an optical module in accordance with the present invention.
Figure 8:
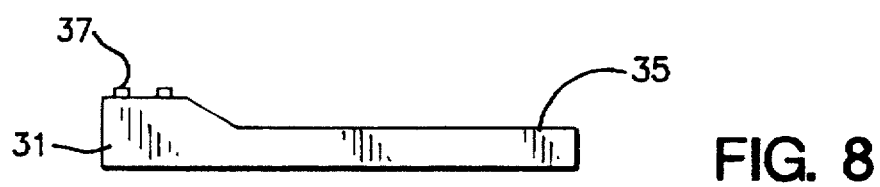
FIG. 8 is a cross-sectional view taken along line A–A' in FIG. 7.

Turning now to FIG. 7, a silicon substrate 31 is subjected thereon with a photolithographic process to form a first groove 35 therein. The silicon substrate 31 having the first groove 35 formed therein is subjected to an anisotropic etching process with use of hydrazine or the like. The first groove 35 was set to have a width of 80 μm and a V-sectional angle of 54.7 degrees. In this case, substrate-side electrode pads 37 are provided. More in detail, the films of the substrate-side electrode pads 37 were made each to have a titan/platinum/gold multi-layered structure and to have a diameter of 50 μm. FIG. 8 is a cross-sectional view of line A–A' in FIG. 7.

Figure 9:
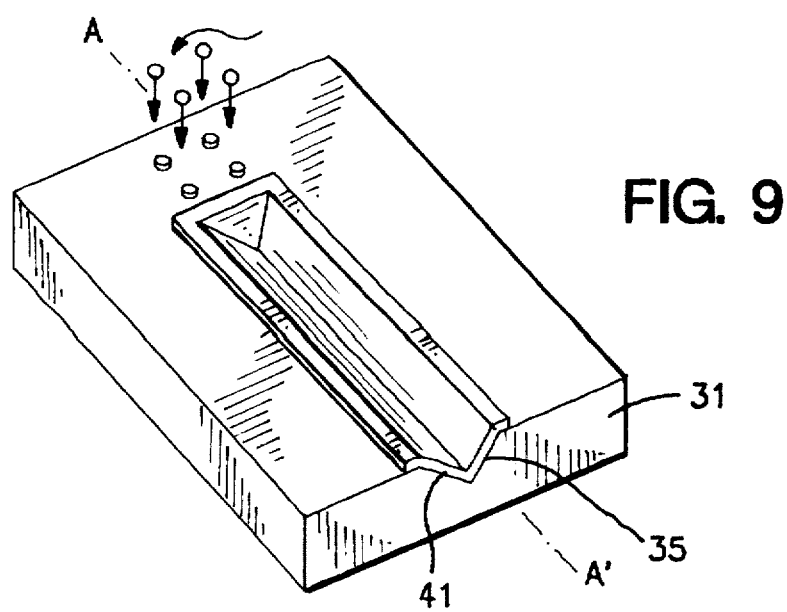
FIG. 9 is a perspective view of a silicon substrate formed therein with a first groove which in turn is formed thereon with a metallic film.

Referring next to FIG. 9, the V-shaped groove 35 is subjected on its inner wall and periphery to a vacuum deposition process with use of gold to form a metallized film 41 of gold thereon.

Figure 10:
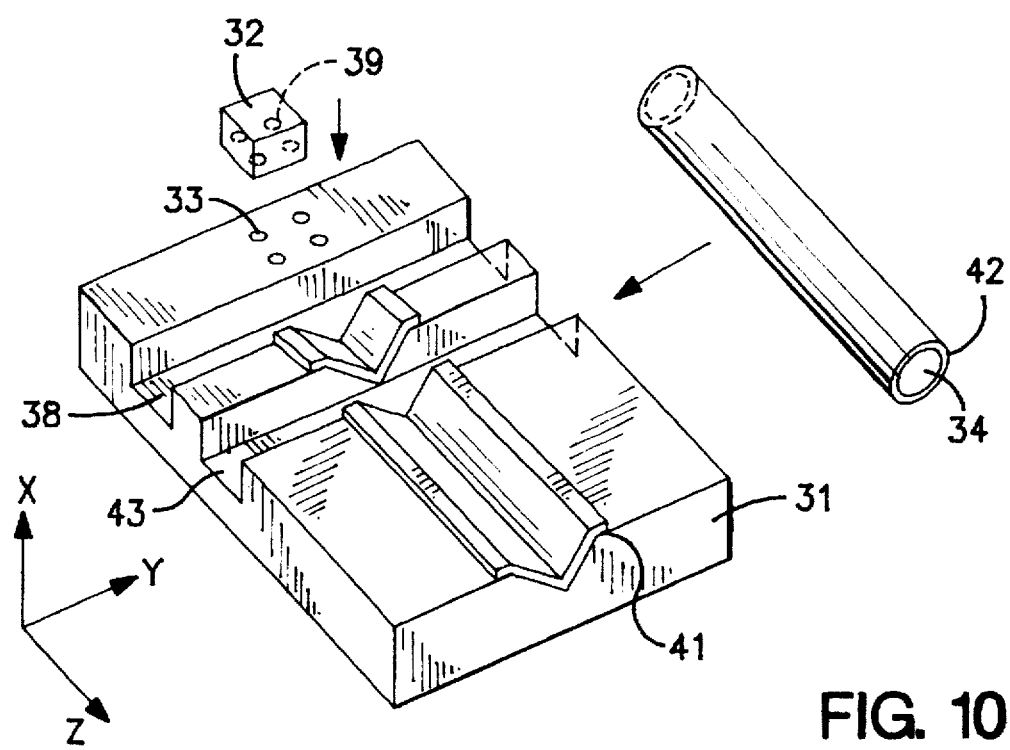
FIG. 10 is a perspective view for explaining how a semiconductor laser and an optical fiber are formed on the silicon substrate having second and third grooves formed therein in a second step of the manufacturing method of the present invention.

In the next step, as shown in FIG. 10, an optical fiber 34 is subjected thereon to an electrolessly plating process to form a gold-metallized film 42 thereon.

Further, the substrate-side electrode pads 37 are supplied with solder pieces by press-cutting, thermocompression bonded and then melted together to thereby form solder bumps 33 of gold and tin. Also formed on a joint side of a semiconductor laser 32 are laser-side electrode pads 39 associated with the solder bumps 33. After completion of the joint, the solder bumps had a height of about 47 μm.

Subsequently, the laser-side electrode pads 39 provided on the semiconductor laser 32 are temporarily mounted on the associated solder bumps 33, and then heated to cause the solder bumps 33 to reflow, producing the self-alignment effect. This self-alignment effect leads to the fact that such X-, Y- and Z-directional positioning as shown in FIG. 10 can be automatically achieved with respect to the semiconductor laser 32. At the time of bonding the semiconductor laser 32 to the silicon substrate 31, these are heated up to 330° C. in a nitrogen atmosphere. In this connection, the bonding of the semiconductor laser 32 may be carried out after formation of a second groove 38 which will be explained below.

The second groove 38 having a rectangular section suitable for positioning of an end face of the optical fiber 34 is then made in the silicon substrate 31 by cutting so as to intersect the V-shaped (first) groove 35 at a right angle. In the illustrated example, the second groove 38 was set to have a width of 100 μm and a depth of 100 μm.

A third groove 43 is made by cutting in the substrate at such a location as opposed to the mounting position of the semiconductor laser 32 with respect to the second groove 38 disposed therebetween. Filler 44 poured onto the optical fiber 34 also partially flows into the third groove 43. For this reason, the third groove 43 acts to prevent the excessive filler from flowing and reaching the semiconductor laser 32.

Of the steps mentioned above until now, the step of forming the second and third grooves 38 and 43 and the step of forming the gold-metallized film 41 on the first groove 35 and in the vicinity thereof may be arbitrarily set in their processing order. However, when the second and third grooves are made in the silicon substrate 31 before the formation of the gold-metallized film 41, there disadvantageously occurs such a problem that, at the time of coating photo-resist, a resultant coated photo-resist has a varying thickness, or a surface to be coated with the photo-resist is rendered repellent to the photo-resist. Accordingly, it is preferable to carry out the formation of the second and third grooves after the formation of the metallized film 41.

Next, the optical fiber 34 having the gold-metallized film 42 previously formed thereon is placed within the first groove 35 and then positioned with respect to its X and Y directions of FIG. 10. This positioning is carried out by moving the optical fiber 34 along the first groove 35 until the optical fiber partially abuts at its one end face against an inner wall face of the second groove 38.

Figure 11:
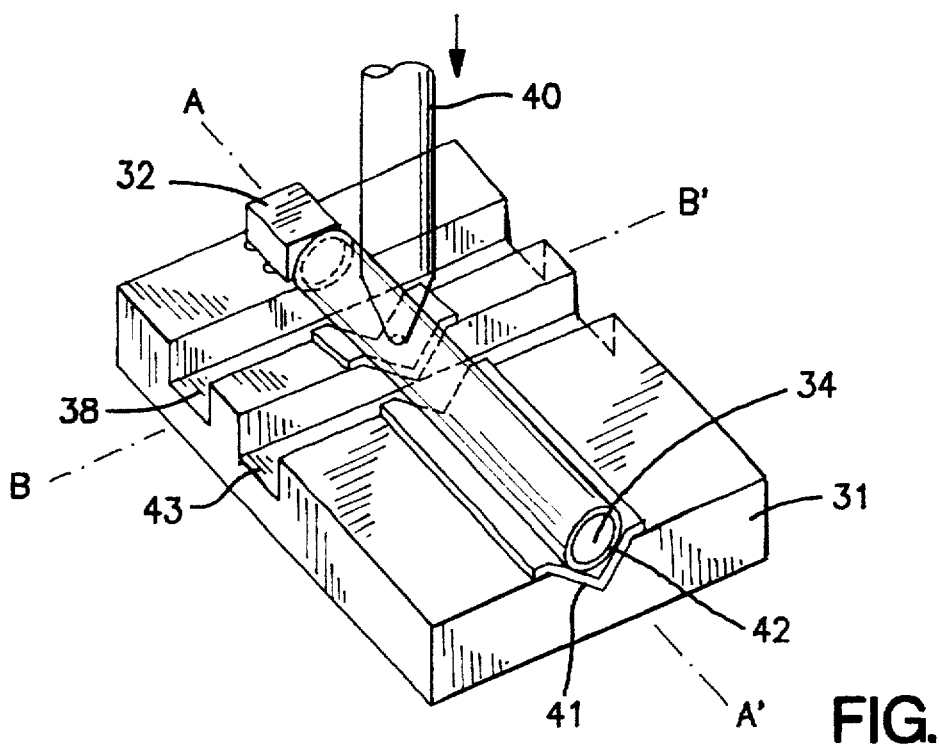
FIG. 11 is a perspective view for explaining a step of pressing optical fiber from its upper side against the substrate with use of a bonding tool in the manufacturing method of the invention.
Figure 12:
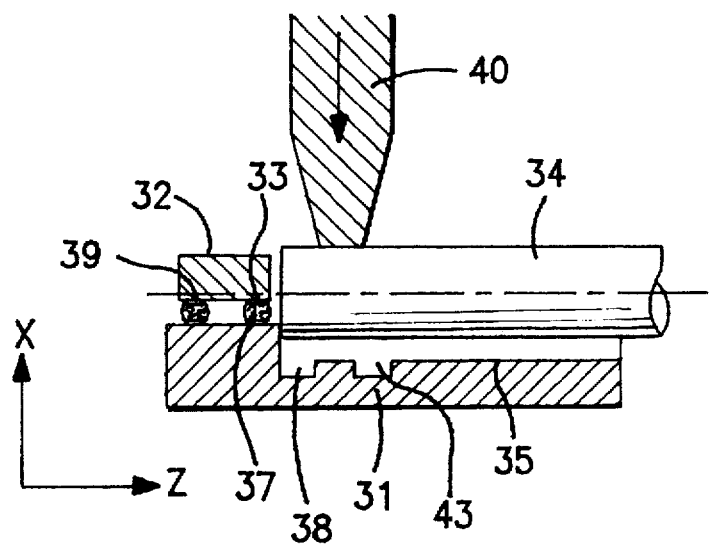
FIG. 12 is a cross-sectional view taken along line A–A' in FIG. 11.
Figure 13:
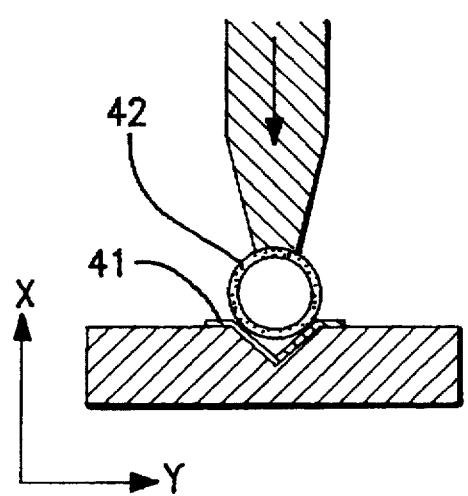
FIG. 13 is a cross-sectional view taken along line B–B' in FIG. 11.

There is shown a step of fixedly mounting the optical fiber 34 with use of a bonding tool 40 in FIGS. 11, 12 and 13, wherein FIG. 11 is a perspective view, FIG. 12 is a cross-sectional view taken along line A–A' in FIG. 11, and FIG. 13 is a cross-sectional view taken along line B–B' in FIG. 11. After the optical fiber 34 is positioned with respect to the respective X, Y and Y directions, the silicon substrate 31 is heated to a temperature of about 200° C., and then the optical fiber 34 is pushed from its upper side against the inner side face of the first groove 35 at a pressure of about 2 p.s.i. with use of the bonding tool 40. In this connection, the bonding tool 40 is installed on the upper side of the optical fiber 34 at such a position that the second and third grooves 38 and 43 are not present directly below the optical fiber 34.

When the optical fiber 34 is pushed by the bonding tool 40 against the heated silicon substrate 31, the heat and the pushing pressure of the bonding tool cause increase of interfacial energy at a contact interface between the metallized film 41 formed on the side of the first groove 35 and the metallized film 42 formed on the optical fiber 34. This increase in the interfacial energy at the contact interface allows easy movement of metal atoms in the vicinity of the contact interface, which results in that mutual diffusion of the metal atoms takes place between the surface of the metallized film 42 of the optical fiber 34 and the surface of the metallized film 41 of the silicon substrate 31, whereby the both metallized films 41 and 42 are joined together. As a result, the optical fiber 34 is fixedly mounted onto the silicon substrate 31.

In this step, it is desirable that there is no impurities such as oxide on both the metallized films of the optical fiber 34 and silicon substrate 31. To this end, these metallized films are made of preferably gold or platinum.

When the optical fiber 34 is pressed by the bonding tool 40, application of ultrasonic vibration (e.g., of about 40kHz) through the bonding tool 40 enables promotion of the mutual diffusion of metal atoms. When there is an oxide film on the metallized films, this ultrasonic vibration also enables breakage or destruction of the oxide film. In this case, the ultrasonic vibration is applied in the length direction of the optical fiber.

Further, in the case where the optical fiber 34 is pressed by the bonding tool 40, when the respective metallized films are plastically deformed in such an extent that the optical axis of the optical fiber 34 provides no influence on the adjusted positional accuracy, its contact area can be increased.

Figure 15:
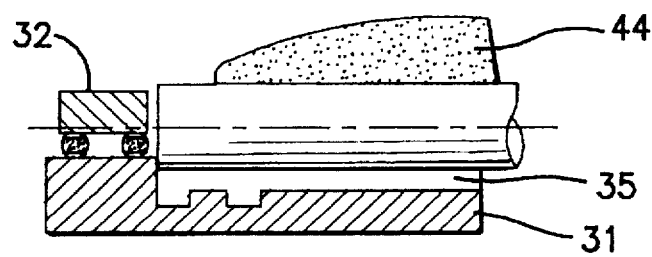
FIG. 15 is a cross-sectional view taken along line A–A' in FIG. 14.
Figure 16:
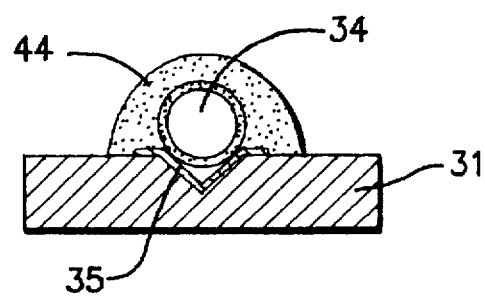
FIG. 16 is a cross-sectional view taken along line B–B' in FIG. 14.

After the fixing of the optical fiber to the substrate, the optical fiber 34 and silicon substrate 31 are covered with the filler 44 to incorporate the junction part of the metallized films thereof, as shown in FIGS. 14, 15 and 16. This enables the junction part of the optical fiber 34 and silicon substrate 31 as well as the optical fiber to be reinforced and protected. During the coating or covering of the filler 44, the filler 44 partially flows into the third groove 43 as excessive filler, whereby the third groove 43 acts to prevent the excessive filler from reaching one end face of the optical fiber 34. This also enables avoidance of increase in the optical coupling loss caused by the filler 44.

In accordance with the aforementioned processes, since the optical fiber 34 can be fixedly mounted to the silicon substrate 31 without intervention of the adhesive or soldering material, any unexpected deviation in the junction position can be avoided and thus a desired coupling efficiency can be attained.

In the above processes, the metallized films 41 and 42 may comprise a first metallized layer which is made of such metal plastically deformable easily by a depressing force as tin and a second metallized layer which is formed on the first metallized layer and which is made of such metal hardly oxidized as gold or platinum.

Figure 17:
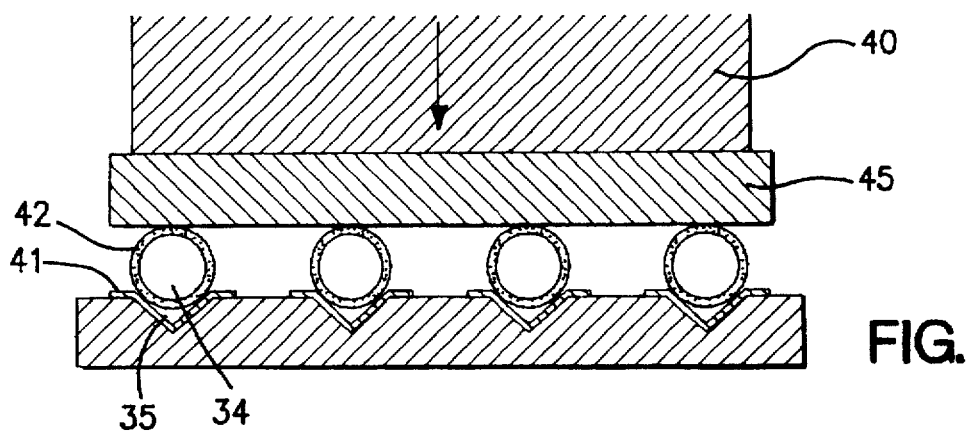
FIG. 17 is a cross-sectional view explaining how to press the optical fiber against the substrate with a buffering material disposed therebetween with use of the bonding tool.

As shown in FIGS. 17 and 18, furthermore, a plurality of optical fibers can be provided in the form of an array. In this case, for the purpose of uniformly applying the pressing force of the bonding tool 40 to the respective optical fibers 34, a buffering material 45 is disposed between the bottom face of the bonding tool 40 and the fiber array. The buffering material 45 is made of, e.g., a resin sheet having a thickness of about 0.5 to 1 mm. Its joining method and other respects are substantially the same as those in the foregoing example.

Although explanation has been made as to the semiconductor laser 32 and optical fiber or fibers 34 in the above examples, an optical element as a light emitting diode (LED), photo diode (PD), light amplification element or optical integrated circuit may be joined and optically coupled to a light transmission path or rod-shaped lens or the like other than the optical fiber 34 in the similar way.

Further, the method of positioning and fixing the light element (semiconductor laser) 32 has been implemented by utilizing the self-alignment effect of the solder bumps 33 in the foregoing. However, such positioning and fixing method can be realized, for example, by utilizing a passive alignment method (refer to a proceeding "Electron. Lett." Vol. 31, No. 9, pp. 730–731, 1995) of pushing an optical element as far as it abuts against a positioning key or a stopper provided on a substrate, or by utilizing a method of positioning a substrate and optical element by recognizing images on markers provided thereto.

When the optical fiber 34 is positioned and fixed by another method on the silicon substrate 31, the first groove 35 is made unnecessary. In this conjunction, the optical fiber 34 is fixed at such a position that the metallized film is formed on the silicon substrate 31.

Though the first groove 35 for receiving the optical fiber 34 therein has been made to have a V-shaped section, any other suitable shape section may be employed for the first groove, so long as the first groove can receive and position the optical fiber 34.

The anisotropic etching process has been employed as the method of making the first groove in the silicon substrate 31 in the above specific examples, but the first groove may be made, e.g., by cutting or by an isotropic etching process.

Similarly, the second and third grooves 38 and 43 may be formed not by machining but by an isotropic etching process.

The formation of the metallized film 41 can be realized by a sputtering process. The formation of the metallized film 42 on the optical fiber 34 may be carried out by a vapor deposition process or a sputtering process. However, the employment of an electroless plating process is advantageous since the electroless plating enables formation of the metallized film 42 on the entire surface of the optical fiber 34 and thus enables its easy joining operation.

Although the formation of the solder bumps 33 has been carried out by the press-cutting, it may be effected by a vacuum deposition process or by a plating process. The solder bumps 33 may be made of lead and tin, and preferably gold and tin.

The material of the metallized film is preferably gold or platinum for the purpose of avoiding any improper junction caused by an oxide film formed on the metal film, but suitable material other than these metals may be used in the present invention. In this connection, in order to suppress formation of any oxide film caused by the heated metal, it is desirable that the joining process of the optical fiber 34 to the silicon substrate 31 be carried out in a non-oxidizing or reducing atmosphere. It is also desirable that, prior to the performance of the joining step, the metallized films be subjected thereon to a removal process with use of such reducing agent as zinc chloride to previously remove any oxide film formed thereon.

The coating of the filler 44 is carried out for the purpose of reinforcing the fixed part of the silicon substrate 31 and optical fiber 34 and protecting the optical fiber 34. The filler 44 may be made of, e.g., epoxy resin. When the above fixed part has a sufficient strength, however, the filler 44 can be omitted. In the absence of the use of the filler 44, the third groove 43 can be also omitted.

As has been explained in the foregoing, in accordance with the present invention, since the junction of the optical waveguide and substrate can be realized without intervention off any layer such as adhesive or soldering material therebetween, advantageously, accurate fixing of the optical fiber can be achieved and the need for adjustment of the optical axis can be eliminated.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An optical module comprising:
   an optical element;
   an optical waveguide having a first metallic film formed thereon, said optical waveguide having one end face optically coupled with said optical element;
   a substrate having a first groove therein which corresponds to a mounting area of said optical waveguide, an inner face of said first groove having a second metallic film formed thereon;
   a second groove in said substrate that intersects said first groove, said one end face of said optical waveguide contacting a side wall face of said second groove; and
   a third groove in said substrate that intersects said first groove and that is spaced farther from said optical element than said second groove;
   wherein said optical waveguide is fixedly mounted to said substrate through a bond of said first metallic film to said second metallic film.

2. An optical module as set forth in claim 1, wherein said second groove has a rectangular section.

3. An optical module as set forth in claim 1, wherein said first and second metallized films are selected from the group of metals consisting of gold and platinum.

4. An optical module as set forth in claim 1, wherein said optical waveguide and its vicinity are covered with filling material.

5. An optical module as set forth in claim 1, wherein plural ones of said optical waveguide are fixedly mounted on said substrate.

6. A method of manufacturing an optical module comprising the steps of:
   making a first groove in a substrate at a position where an optical waveguide is to be mounted;
   forming a first metallized film on an inner wall face of the first groove;
   forming a second groove in the substrate intersecting the first groove adjacent a position where an optical element is to be mounted;
   forming a third groove in the substrate intersecting the first groove, the third groove being farther from where the optical element is to be mounted than the second groove;
   forming a second metallized film on at least a part of the optical waveguide to be contacted with said first metallic film;

positioning one end face of the optical waveguide with a wall face of the second groove;

pressing together and heating said second metallized film and said first metallized film; and installing the optical element on the substrate so that the optical element is optically coupled with the one end face of said optical waveguide.

7. A method of manufacturing an optical module as set forth in claim 6, wherein, at the time of applying the pressing force to said first and second metallized films, ultrasonic vibration is applied to at least one of said substrate and said optical waveguide.

8. A method of manufacturing an optical module as set forth in claim 6, further comprising the step of, after the heating and pressing, covering said optical waveguide and its vicinity with filling material.

9. A method of manufacturing an optical module as set forth in claim 6, wherein a plurality of the first metallized films are formed on said substrate at a plurality of locations where a plurality of the optical waveguides with the second metallized film thereon are to be mounted, and said pressing is carried out by placing a buffering material on said plurality of optical waveguides and pressing on the buffering material.

10. A method of making an optical module comprising the steps of:

affixing a first metallic film on a substrate where an optical waveguide is to be mounted;

affixing a second metallic film on the optical waveguide adjacent an end thereof which is to be mounted on the substrate; and bonding the first metallic film to the second metallic film by mutually diffusing the atoms thereof to attach the optical waveguide to the substrate, the bonding including the steps of heating the substrate and pushing the second metallic film onto the first metallic film.

11. The method of claim 10, wherein the substrate is heated to about 200° C.

12. The method of claim 10, wherein the second metallic film is pushed onto the first metallic film with about 2 psi pressure.

13. The method of claim 10, wherein the optical waveguide is an optical fiber and the step of affixing the second metallic film comprises the step of affixing the second metallic film around a circumference of the optical fiber.

14. The method of claim 13, wherein the step of pushing the second metallic film comprises the step of pushing on a first portion of the second metallic film with a bonding tool which is ultrasonically vibrating so as to bond a second portion of the second metallic film diametrically opposing the first portion to the first metallic film.

15. The method of claim 14, wherein the second metallic film is pushed with about 2 psi pressure.

16. The method of claim 15, wherein the substrate is heated to about 200° C.

17. The method of claim 10, further comprising the steps of forming a first generally rectangular groove in the substrate transverse to an axis of the optical waveguide, and positioning an end face of the waveguide against a side wall of the rectangular groove so that a planar portion of the end face contacts a planar portion of the side wall.

18. The method of claim 17, further comprising the step of forming a second groove in the substrate generally transverse to the axis of the optical waveguide spaced from the first groove.

19. The method of claim 10, further comprising the step of forming a groove in the substrate along an axis of the optical waveguide, and wherein the step of affixing the first metallic film comprises the step of affixed the first metallic film to side walls of the groove.

20. An optical module comprising:

a first metallic film affixed to a substrate;

an optical waveguide having a second metallic film affixed thereto; and said first metallic film being bonded to said second metallic film by mutual diffusion of the atoms of said first and second metallic films to attach the optical waveguide to the substrate.

21. The module of claim 20, wherein said optical waveguide is an optical fiber and said second metallic film is affixed around a circumference of said optical fiber.

22. The module of claim 20, further comprising a first generally rectangular groove in said substrate transverse to an axis of said optical waveguide.

23. The module of claim 22, wherein an end face of said optical waveguide has a planar portion which contacts a planar portion of a side wall of said rectangular groove.

24. The module of claim 23, further comprising a second groove in said substrate generally transverse to the axis of said optical waveguide spaced from said first groove.

25. The module of claim 20, further comprising a groove in said substrate along an axis of said optical waveguide, and wherein said first metallic film is affixed to side walls of said groove.

* * * * *